United States Patent [19]

Birchall et al.

[11] 3,801,362

[45] Apr. 2, 1974

[54] METHOD FOR IMPREGNATING CELLULOSIC SUBSTRATES

[75] Inventors: James Derek Birchall, Norley; John Edward Cassidy, Hartford; Douglas Norton Buttrey, Broxbourne, all of England

[73] Assignee: Imperial Chemical Industries, Limited, London, England

[22] Filed: Dec. 10, 1971

[21] Appl. No.: 206,914

[30] Foreign Application Priority Data
Dec. 11, 1970  Great Britain .................... 59020/70

[52] U.S. Cl. ....... 117/143 B, 117/143 R, 117/169 R
[51] Int. Cl. ...................... D06m 13/26, B32b 23/04
[58] Field of Search ......... 117/143 R, 143 B, 169 R

[56] References Cited
UNITED STATES PATENTS
2,909,451  10/1959  Lawler et al. ....................... 117/169

FOREIGN PATENTS OR APPLICATIONS
2,051,101  2/1971  France ................................ 117/169
2,046,931  6/1971  Germany ........................... 117/169
2,028,839  3/1971  Germany ........................... 117/169

Primary Examiner—William D. Martin
Assistant Examiner—Harry J. Gwinnell
Attorney, Agent, or Firm—Cushman, Darby & Cushman

[57] ABSTRACT

Treating a cellulosic substrate, e.g., paper, wood or cork, by impregnating the surface with a complex phosphate of aluminium containing halogen and chemically bound molecules of a hydroxy compound which may be water or an organic hydroxy compound, and curing the complex, preferably by gentle heating. The complex is most conveniently used in solution in water or an organic solvent e.g., methanol, and the solution may contain further materials, e.g., an organic polymer. Products are more durable and less permeable than the original cellulosic materials.

14 Claims, No Drawings

METHOD FOR IMPREGNATING CELLULOSIC SUBSTRATES

This invention relates to cellulosic substrates, to a process for impregnating such substrates, and, in particular, to cellulosic substrates impregnated with aluminium phosphate.

By a "cellulosic substrate" is meant a material having a content of cellulose or similar substances, typical materials including paper, wood and cork. The substrate may be in any convenient form. For example paper will normally be in the form of a sheet or strip when treated in accordance with the process of this invention, but the process is also applicable to the treatment of massive substrates, such as blocks of wood and articles fabricated therefrom, and to materials in granular or powder form, such as particulate cork or wood sawdust.

For various applications of substrates of the kind herein described it is desirable that the substrate should be impregnated with one or more of a variety of agents to alter or enhance the surface properties of the substrate. Thus, it may be desired to provide a barrier coating on the surface of articles of furniture, for example a thermally reflective coating on a table top or other domestic working surface, or a barrier coating to prevent penetration of the working surface by fats and other contaminants with which the surface is likely to be in contact. A paper substrate may be impregnated for various reasons, for example to improve the printability thereof or, where the paper is intended for use as a packaging material, to provide a barrier against penetration by water, water vapour, greases, fats, oils and other miscellaneous materials which are likely to come into contact with the paper. Absorption of contaminants by cork gaskets may be prevented or reduced by providing a barrier coating on the gasket.

Accordingly, this invention provides a process for treating a cellulosic substrate which comprises impregnating the surface of the substrate with a complex phosphate of aluminium, as hereinafter defined, and curing the complex phosphate impregnant by decomposition.

The complex phosphate impregnant is preferably cured by heating to a temperature of at least 80°C, although for many embodiments of the invention slow curing may be carried out at temperatures as low as 20° to 50°C. Curing temperatures between 50° and 80°C are generally convenient for substrates which are especially unstable to heating, but where reasonably rapid curing is desired.

The complex aluminium phosphates used in the compositions of the present invention are halogen-containing complex phosphates of aluminium containing at least one chemically bound molecule of a hydroxy compound R—OH wherein R is a hydrogen atom or an organic group. Such materials are described in U.S. application Ser. No. 42,499, filed June 1, 1970, now refiled as Ser. No. 274,964, filed July 25, 1972, the disclosure of which is incorporated herein by reference.

On heating these complex phosphates at relatively low temperatures, they decompose evolving a hydrogen halide and the compound R—OH to form a hard abrasion-resistant aluminium phosphate. At temperatures above 50°C, for example, 100° to 180°C, decomposition is rapid. As used herein, the term "complex aluminium phosphate" denotes the material prior to decomposition while the term "aluminium phosphate" denotes the product obtained by decomposing the complex aluminium phosphate.

If the complex aluminium phosphate is applied as a solution in a suitable solvent, for example, water or an alcohol such as methanol or ethanol, to a substrate, on removing the solvent and decomposing the complex aluminium phosphate, the aluminium phosphate produced forms a strongly adherent coating on the substrate that is stable to high temperatures.

Preferably the halogen in the complex aluminium phosphate is chlorine. Also it is preferred that R is an aliphatic hydrocarbon or substituted hydrocarbon group; in particular it is preferred that the hydroxy compound is an aliphatic alcohol containing one to four carbon atoms, particularly methanol or ethanol. The complex phosphate may contain chemically bound water or both chemically bound water and a chemically bound organic hydroxy compound. The ratio of the number of gram atoms of aluminium to the number of gram atoms of phosphorus in the complex phosphates of aluminium may vary over a wide range, for example, from 1:2 to 2:1, but is preferably substantially 1:1 as complex phosphates of the invention having this ratio decompose at low temperatures directly to form aluminium orthophosphate having greater chemical stability and refractoriness than aluminium phosphate formed from complex phosphates with other ratios. As a typical example the complex aluminium phosphate has an empirical formula $AlPClH_{25}C_8O_8$ which can be designated aluminium chlorophosphate ethanolate, although it must be understood that this designation in no way implies any particular molecular structure for the compound. An example of a complex phosphate containing chemically bound water, that is when R is a hydrogen atom, is the complex having the empirical formula $AlPClH_{11}O_9$ which can be designated aluminium chlorophosphate hydrate, although it must be understood that this designation in no way implies any particular molecular structure for the compound.

The complex phosphate impregnants of this invention are applied to the cellulosic substrates in any convenient manner. Thus, a layer of a dry, powdered complex phosphate may be spread on the surface of a substrate and subsequently cured by heating, or a substrate of complicated shape may be coated with a layer of a suitable adhesive such as casein, and coated with dry, powdered complex phosphate, for example, by immersion of the substrate in a fluidised bed of the impregnant.

Alternatively, and most conveniently, the impregnants are employed as a solution of the complex phosphate in aqueous or organic solvent. The organic solvent is preferably a polar solvent, especially an oxygen-containing polar solvent. Especially useful are aliphatic alcohols containing up to ten carbon atoms, esters, polyhydric alcohols, and glycol esters. Most preferred are aliphatic alcohols containing one to five carbon atoms, for example methanol or ethanol. The solvent may be a mixture of solvents, such as a mixture of methanol and chloroform. When the solvent comprises water it is preferred to use a crystallisation stabiliser, for example finely divided silica or alumina, or a nucleation activator or catalyst, for example dibutyl peroxide, or calcium, magnesium or sodium chloride. When the solution of the complex phosphate is non-aqueous, for example, when the solvent is ethanol, it is preferred to use a boric acid ester or ether or a silicic acid ester or ether, for example, methyl borate, trimethoxy boroxine or ethyl silicate to suppress the crystallisation of aluminium phosphate.

Application of the complex phosphate impregnant solution to the cellulosic substrate is achieved by any of the conventional coating techniques, for example, by spraying a solution of the complex phosphate on to the surface of the substrate or by immersing the substrate in a bath of the impregnant solution. In the case of a strip-like substrate, for example, a paper substrate, impregnation of both surfaces of the paper is conveniently achieved by reeling a continuous paper strip through a bath of the impregnant solution. Impregnation of one side of a paper strip is readily achieved by employment of a triple-roll system of the type exmployed in a lithographic printing process. In the latter impregnation process film strip is passed through the nip between a pair of contra-rotating cylindrical rolls, viz a coating roll and a backing roll. Impregnant solution is applied to the coating roll, and thence to a strip substrate, by means of a transfer roll which rotates in surface contact with the coating roll and which picks up impregnant solution from a solution reservoir, for example either by partial immersion of the transfer roll in the reservoir or by means of a multi-roll train interposed between the reservoir and the transfer roll, or by any other convenient method.

The impregnant coatings may be continuous or discontinuous, being deposited, for example, only on those portions of the substrate which are to be subjected to further treatment, as for example by the application of printed matter. In the case of impregnant coatings applied by a spraying process, discontinuous coating is conveniently achieved by employing a suitable masking technique, whereas for coatings applied by a roller system a discontinuous coating is most conveniently achieved by means of a transfer roll which is suitably profiled to deposit the desired pattern of impregnant solution on to the coating roll and thence on to the film substrate.

The extent of penetration of the impregnant solution will depend, amongst other things, upon the structure of the particular cellulosic substrate being impregnated. For any particular cellulosic substrate, control of penetration may be effected by suitable choice of the flow properties of the impregnant solution; for example, the viscosity of the solution may be controlled by the choice of solvent and/or the addition of a viscosity improver, especially an organic polymer.

Penetration of the impregnant solution into the structure of the cellulosic substrate is assisted, if desired, by effecting impregnation under conditions of superatmospheric pressure, for example, by immersion of a substrate in a bath of impregnant solution maintained at a pressure greater than atmospheric.

In the case of substrates in granular or powder form, for example wood or cork, it is convenient to fill a mould of the desired shape with either a dry blend of granulated or powdered substrate and complex aluminium phosphate or of a substrate which has been coated with a solution of the complex phosphate and then to cure the contents of the mould, preferably by heating.

The complex phosphate impregnant deposited in or on the substrate is most conveniently cured by heating, which serves both to remove solvent, if present, and to decompose the complex aluminium phosphate to form a strongly adherent layer of aluminium phosphate on the substrate. Heating of the phosphate impregnant is effected by any convenient means, for example, by passage of the impregnated substrate through an air oven maintained at the requisite temperature or by a heated jacket on the mould containing a granulated or powdered substrate. Alternatively, the impregnated substrate may be compressed between the platens of a heated press to form a board, or when the substrate is incapable of withstanding the curing temperature, the impregnant is heated by a method which does not heat the substrate, for example by micro-wave heating. The duration of heating may extend from 10 seconds to 60 minutes and is preferably at least 10 minutes. The degree of curing and the form of aluminium phosphate produced will depend, amongst other things, upon the temperature to which the coating is heated and the duration of heating. A temperature of at least 50°C is normally sufficient to form a coat of aluminium phosphate within a convenient time.

Sufficient of the complex aluminium phosphate impregnant is employed in the process of the present invention to deposit on the cellulosic substrate a layer comprising aluminium phosphate having a thickness which is conveniently between about 0.1 and 20 microns, and preferably less than 10 microns, and may even be as little as 0.01 micron. When the impregnant layer is required to exhibit transparency we prefer to maintain the thickness of the cured coating below about 2.5 to 3 microns. Impregnant layers of thickness greater than about 3 microns tend to become powdery and opaque.

Organic materials, preferably polymers, may be dissolved in the solutions from which impregnant layers of this invention are produced to give layers comprising an organic material and aluminium phosphate. It is advantageous to add a suitable wetting agent, such as a perfluorinated surfactant, to the impregnant solution to assist uniform impregnation. Other components, for example pigments and viscosity improvers, may be incorporated by including them in the impregnant solution.

Although the impregnants of this invention are suitable for application directly onto untreated cellulosic substrates, our invention does not preclude the prior treatment of the substrate, for example by mechanical roughening or electron discharge treatment, to promote adhesion of the impregnant to the substrate. In addition or alternatively, fillers such as finely divided silica, silicates or calcium carbonate may be incorporated into either or both the cellulosic substrate and the applied impregnant layer to promote adhesion therebetween. Other additives which may be blended into the impregnant layer include anti-friction materials, such as powdered graphite, molybdenum disulphide and polytetrafluoro-ethylene.

Our invention also provides a cellulosic substrate impregnated with an aluminium phosphate, as hereinbefore defined.

The impregnated products of our invention are of wide applicability as they show reduced impermeability to many materials, for example, solvents, vapours, gases, oils, greases and fats. Thus, impregnated paper is particularly suitable for use as a packaging material to prevent contamination of goods packaged therein. Paper cups and other paper vessels, impregnated in accordance with our invention, are solvent-and-scratch-resistant. The durability and wash-resistance of wallpapers and other decorative coverings is improved by our impregnation treatment, and documents of a confidential nature, such as credit cards, passports and the like, may be rendered more secure against unauthorised amendment or alteration by impregnation with the complex phosphates of this invention.

Wood substrates, including laminated woods, chip board and the like, impregnated in accordance with our invention exhibit improved thermal and stain-resistance and are particularly suitable for use as domestic working surfaces such as table tops. Reclamation of wood particles or powders is also achieved by impregnation of the particles or powders with our complex phosphates which, when cured, bind these particles or powders into a type of synthetic wood.

Preformed cork gaskets for use in providing a fluid-tight joint between cooperating surfaces may be impregnated to prevent contamination of the gasket by the fluids with which it is likely to be in contact. Typical applications include cap liners for bottle closures, gaskets for jointing industrial pipework, and applications where thermally-resistant gaskets are required, as, for example, in manifold-cylinder head gaskets for internal combustion engines.

Granulated cork may be bound into gaskets of the desired shape by impregnation in accordance with the process of our invention and for some applications a mixture of cork particles and complex phosphate solution can be moulded in situ, for example, in a shaped flange, or aperture, thus ensuring production of a perfectly fitting gasket. Curing in situ, for example, by heating the flanged joint, also ensures that the resultant gasket adheres securely to the flange to assist the formation of a fluid-tight joint.

The invention is illustrated by, but not limited to, the following examples:

EXAMPLE 1

A solution comprising 20 g of aluminium chlorophosphate ethanolate and 80 g of methanol was prepared. A sample of 50 $\mu$m thick unsized base paper (1½ inches × 3 inches) was lowered into the coating solution and allowed to stand for 2 minutes before being drawn at a fixed rate of 3 inches/minute. The coated sample was allowed to dry for 5 minutes at 5 percent relative humidity under a stream of dry nitrogen and was then transferred to an oven where it was cured at 90°C for 0.5 hour.

EXAMPLE 2

A piece of wood (1½ inches × 1 inch × ½ inch) was dip-coated a solution comprising 10 g of aluminium chlorophosphate ethanolate in 90 g of methanol. The wood sample was immersed in the coating solution for ten minutes by means of a metal weight which was placed on top of the sample. The coated sample was subsequently removed from the solution and allowed to dry under anhydrous conditions in a dry box in a stream of nitrogen. After drying in this manner for 10 minutes the coated sample was transferred to an oven where it was cured for 20 minutes at 100°C.

EXAMPLE 3

A piece of paper (1½ inches × 1 inch × 50 $\mu m$) was dip-coated, as described in Example 1, in a 5 percent w/w aluminium chloro-phosphate ethanolate in methanol solution and allowed to dry in a stream of nitrogen for 10 minutes at 1.5 percent relative humidity. The coated sample was again dip-coated in the same solution and dried under the same conditions. The coated sample was not cured thermally but was allowed to air-cure under ambient conditions, i.e., 20°C at 60 percent relative humidity.

EXAMPLE 4

A solution containing 0.5 g hydroxy propyl cellulose and 10 g of aluminium chlorophosphate ethanolate and 89.5 g of methanol was used to coat a 6 inch square 50 $\mu m$ thick base paper by the Mayer bar technique. The viscous solution was applied to one edge of the paper and the Mayer bar drawn across the paper surface at a fixed rate so that an even coating was produced. Thus the bulk of the coating formulation was applied at the surface of the paper. The coating was air-dried for one hour under ambient conditions before being cured at 70°C for 0.5 hour.

EXAMPLE 5

A 2 inch long, 1 inch diameter cork sample was immersed in 100 g of 20 percent by weight aluminium chlorophosphate ethanolate solution in methanol. A steel plate was placed on top of the cork so that the cork was immersed completely in the coating solution.

After 15 minutes' immersion the impregnated cork sample was released by removing the steel plate from the bath. The cork was then transferred to an oven where it was cured at 70°C for 20 minutes.

EXAMPLE 6

25 g of a 60:40 dry mix (by weight) of aluminium chloro-phosphate hydrate:wood chippings was added to a press mould and 0.25 g of water added. The mix was pressed at a loading of 0.2 ton/square centimetre and was allowed to dry at 5 percent relative humidity for 24 hours. The moulding was then cured at 120°C for 1 hour, to give a hard coherent block of reconstituted wood.

What we claim is:

1. A process for treating a cellulosic substrate which comprises impregnating the surface of the substrate with a solution of a halogen-containing complex phosphate of aluminium containing at least one molecule of a hydroxy compound ROH where R is a hydrogen atom or an organic group, and curing the complex phosphate impregnate by decomposition to aluminium phosphate.

2. A process as claimed in claim 1 wherein the complex phosphate impregnant is cured by heating to a temperature of at least 80°C.

3. A process as claimed in claim 1 wherein the complex phosphate impregnant is cured by heating to a temperature of 50° to 80°C.

4. A process as claimed in claim 1 wherein the complex phosphate impregnant is cured at a temperature of 20° to 50°C.

5. A process as claimed in claim 1 wherein the halogen in the complex aluminium phosphate is chlorine 6. A process as claimed in claim 1 wherein the complex aluminium phosphate contains a chemically bound aliphatic alcohol containing one to four carbon atoms.

7. A process as claimed in claim 6 wherein the aliphatic alcohol is methanol or ethanol.

8. A process as claimed in claim 7 wherein the complex aluminium phosphate has the empirical formula $AlPClH_{25}C_8O_8$.

9. A process as claimed in claim 1 wherein the complex aluminium phosphate contains chemically bound water.

10. A process as claimed in claim 1 wherein the complex aluminium phosphate has the empirical formula $AlPClH_{11}O_9$.

11. A process as claimed in claim 1 wherein the surface of the substrate is impregnated with a solution of the complex phosphate in aqueous or organic solvent.

12. A process as claimed in claim 11 wherein the organic solvent comprises an aliphatic alcohol.

13. A process as claimed in claim 12 wherein the aliphatic alcohol is methanol or ethanol.

14. A process as claimed in claim 11 wherein the solution of complex phosphate contains an organic polymer.

* * * * *